(12) United States Patent
Antoine et al.

(10) Patent No.: US 6,227,784 B1
(45) Date of Patent: May 8, 2001

(54) FASTENER ASSEMBLY WITH VIBRATION ISOLATING FEATURES

(75) Inventors: Darren B. Antoine, South Elgin; James R. Zwick, Lemont; Stephen M. Yob, Libertyville, all of IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/375,735

(22) Filed: Aug. 17, 1999

(51) Int. Cl.[7] ............................. F16B 21/18; F16B 33/00
(52) U.S. Cl. ........................ 411/369; 411/11; 411/353; 411/544; 411/999
(58) Field of Search ........................... 411/107, 352, 411/353, 10, 11, 970, 999, 544, 369

(56) References Cited

U.S. PATENT DOCUMENTS

| | | |
|---|---|---|
| 128,602 | 7/1872 | Dittman . |
| 1,096,846 | 5/1914 | Lane . |
| 2,339,549 | 1/1944 | Kubaugh . |
| 2,459,658 | 1/1949 | Klein . |
| 2,915,152 | 12/1959 | Graham . |
| 3,362,276 | 1/1968 | Gould . |
| 3,695,386 | 10/1972 | Thien et al. . |
| 4,027,644 | 6/1977 | Timour . |
| 4,206,931 | 6/1980 | Tomita et al. . |
| 4,306,708 | 12/1981 | Gassaway et al. . |
| 4,345,552 | 8/1982 | Kasting et al. . |
| 4,471,731 | 9/1984 | Kasting et al. . |
| 4,495,903 | 1/1985 | Asano . |
| 4,906,154 | 3/1990 | Sheppard . |
| 4,975,008 | 12/1990 | Wagner . |
| 5,193,960 | 3/1993 | Fukushima et al. . |
| 5,255,647 | 10/1993 | Kiczek . |
| 5,323,740 | 6/1994 | Daily et al. . |
| 5,393,183 | 2/1995 | Hinton . |
| 5,397,206 | 3/1995 | Sihon . |
| 5,433,568 | 7/1995 | Thaler . |
| 5,489,177 | 2/1996 | Schmidt, Jr. . |
| 5,513,603 | 5/1996 | Ang et al. . |
| 5,584,628 | 12/1996 | Bernoni . |
| 5,662,444 | 9/1997 | Schmidt, Jr. . |
| 5,688,091 | 11/1997 | McKinlay . |
| 5,871,319 | * 2/1999 | Schneider .................. 411/353 X |
| 6,030,161 | * 2/2000 | Udell et al. ............... 411/353 |
| 6,059,503 | * 5/2000 | Johnson .................... 411/353 |

* cited by examiner

Primary Examiner—Neill Wilson
(74) Attorney, Agent, or Firm—Reising, Ehtington, Barnes, Kisselle, Learman & McCulloch P.C.

(57) ABSTRACT

A multi-part vibration isolating fastener assembly includes a bolt having a threaded shank and a head about which a sleeve and resilient grommet are disposed. A cup washer is disposed about and captured axially on the grommet to provide a unitized assembly. The integrated cup washer defines a self-contained cup-shaped socket to provide proper support and containment for the grommet in applications where the usual cup-shaped grommet wall is lacking in the components to be assembled, such as a valve cover, and cylinder head.

10 Claims, 2 Drawing Sheets

FASTENER ASSEMBLY WITH VIBRATION ISOLATING FEATURES

BACKGROUND OF THE INVENTION

1. Technical Field

This invention relates to multi-part fastener assemblies having vibration isolating features. Such fasteners are used, for example, to secure a valve or rocker arm cover of an engine to the cylinder head while preventing vibration from being transmitted through the fastener from one component to the other (e.g. from the cylinder head to the valve cover or body).

2. Related Prior Art

Multi-part fastener assemblies are well known for attaching two components, such as a valve or rocker arm cover to a cylinder head in a manner that prevents vibration from being transmitted through the fastener from one of the components to the other. U.S. Pat. No. 4,975,008 shows the general construction of such fasteners, wherein a captive sleeve is disposed about the threaded shank of a bolt, confronting the head of the bolt at its upper end and the cylinder head at its lower end to limit the torque of the bolt when tightened. A resilient grommet is carried about the sleeve and, as illustrated, is received in a cup-shaped well provided in the cylinder head or, in this case, a rocker arm cover. As the bolt is tightened, the grommet is compressed and is deformed and contained within the well of the clamped member. The grommet serves to isolate the bolt from the rocker arm cover as well as to seal the access opening for the bolt.

Fasteners of the above general type are satisfactory in applications where there is sufficient support for the grommet (i.e., enough space to provide a cup-shaped well into which the grommet is received). As engines become smaller and more compact and the available space for the various components of the engine becomes less and less, there likely will be some applications in which the space required to provide the needed grommet well is not available or, if available, could be better used by other engine components.

It would thus be desirable to provide a vibration isolating fastener assembly that does not require support by a grommet well of the clamped component, such as a valve or rocker arm cover.

SUMMARY OF THE INVENTION AND ADVANTAGES

A fastener assembly according to the invention comprises a fastener having a head and a threaded shank extending axially from the head, an elongate sleeve disposed about the shank, a resilient grommet disposed about and captured on the sleeve, and an integrated, rigid cup washer disposed about and captured on the grommet.

The integrated cup washer enables the fastener assembly to be used in applications where there would otherwise be insufficient support for the grommet. The integrated cup washer eliminates the need to provide a full grommet well on the clamped component (e.g., the valve or rocker arm cover). Such simplifies the manufacture and securement of the clamped component, since the provision of grommet wells is not required.

Another advantage of the present invention is that, where a given application has some bolt mounting locations formed with grommet wells and others without, the subject fastener assembly can be used in both environments without modification and thus is far more versatile than traditional multi-component vibration-isolating fasteners lacking the cup washer.

A further advantage of the present invention is that the cup washer is formed as an integrated part of the fastener assembly, retaining the advantages of a multi-part fastener.

THE DRAWINGS

These and other features and advantages of the present invention will become more readily appreciated when considered in connection with the following detailed description and appended drawings, wherein.

DETAILED DESCRIPTION

Figure 1:
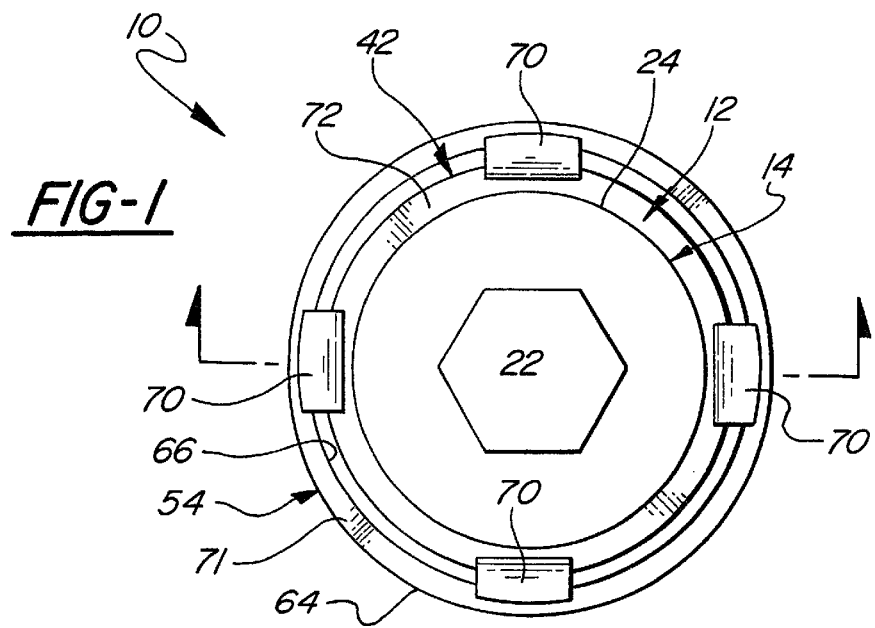
FIG. 1 is a top plan view of a fastener assembly constructed according to the invention.

A multi-part vibration isolating fastener assembly constructed according to a presently preferred embodiment of the invention is shown generally at 10 in the drawings and comprises a fastener 12 in the preferred form of a bolt having a head 14 secured to an upper end 16 of a threaded shank 18 which extends along a longitudinal axis A of the fastener assembly 10 to an opposite lower free end 20.

The head 14 includes a hexagonal tool-engaging portion 22 and an integral load-bearing cylindrical flange 24 extending radially outwardly of the tool-engaging portion 22 and presenting a lower load-bearing surface 26.

Figure 2:
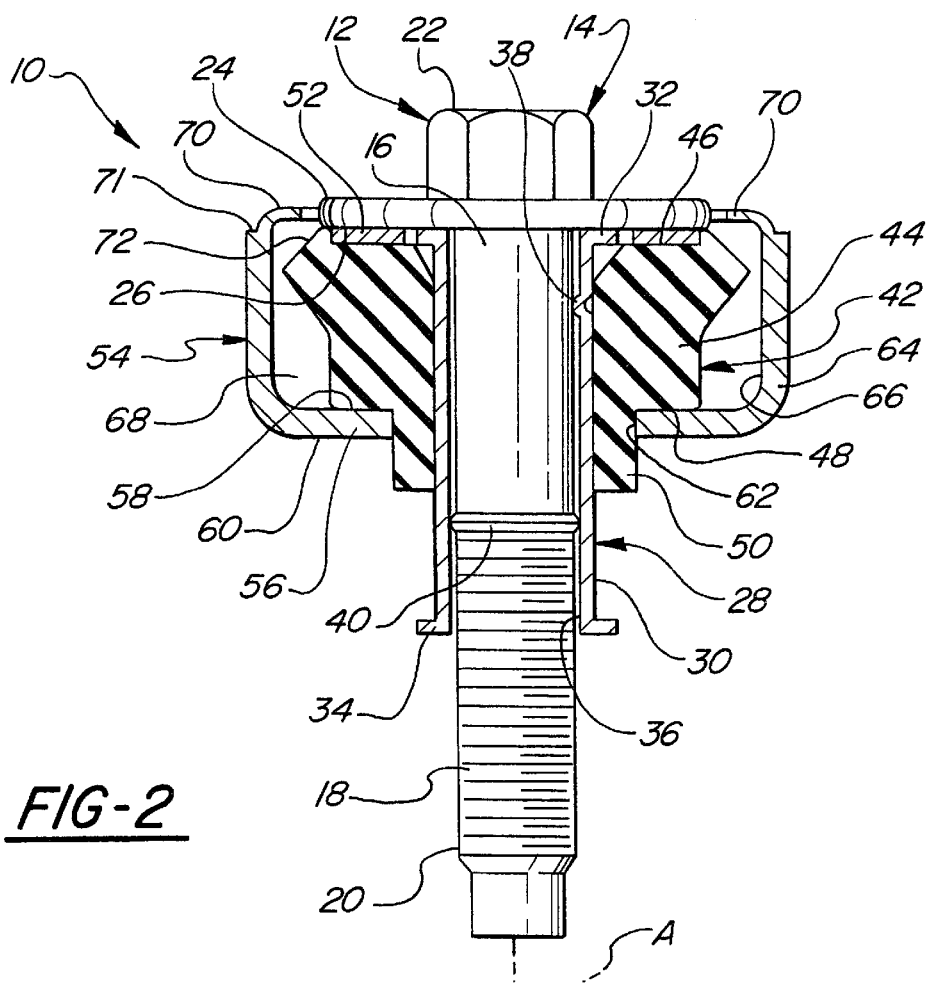
FIG. 2 is a cross-sectional view taken generally along lines 2—2 of FIG. 1.
Figure 3:
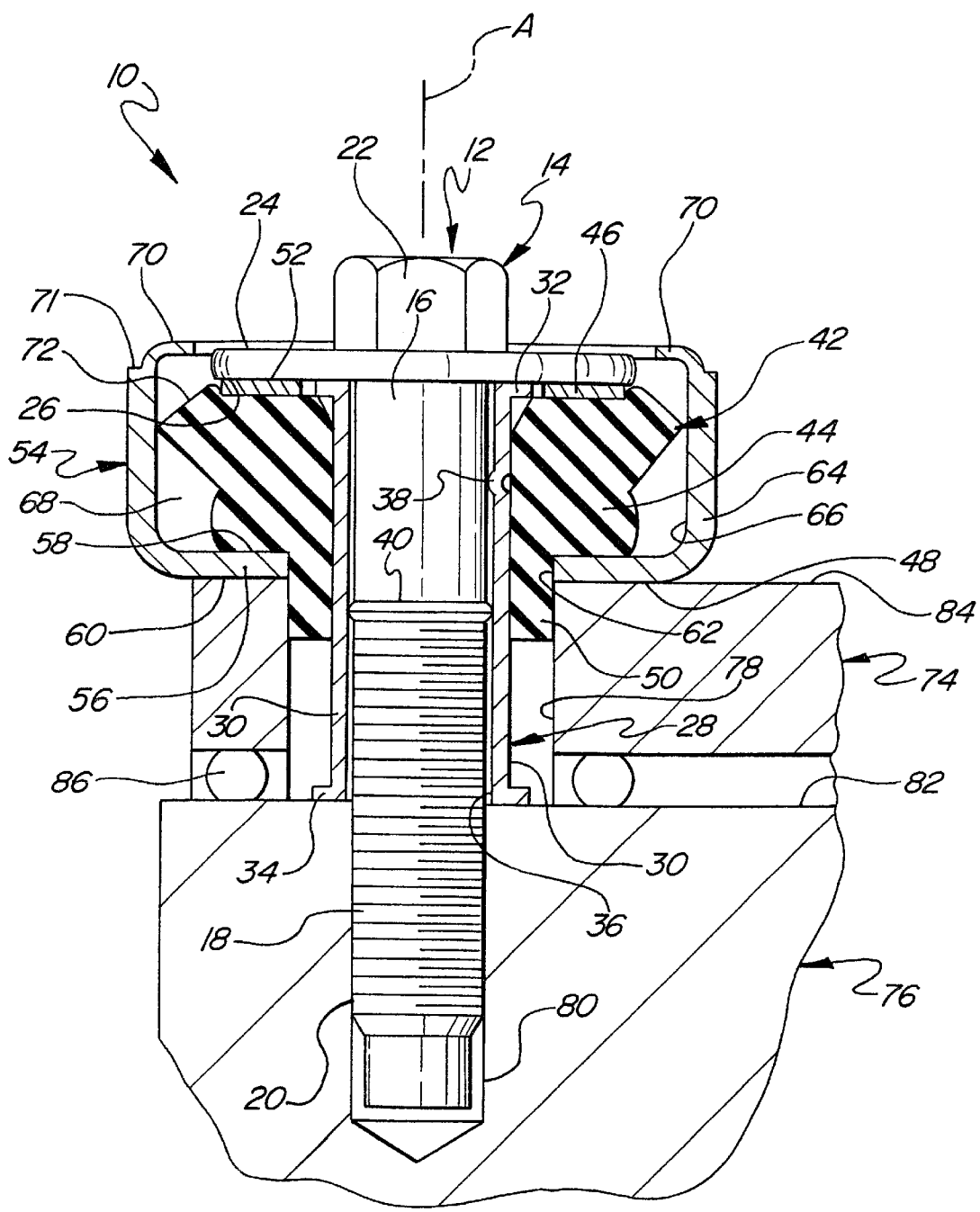
FIG. 3 is an enlarged longitudinal cross-sectional view like that of FIG. 2, but showing the fastener in an installed condition joining two members.

The assembly 10 includes a sleeve 28 having an axially elongated cylindrical body 30 disposed about the shank 18 of the fastener 12 and formed at its opposite ends with integral upper and lower end flanges 32–34, projecting radially outwardly of the body 30. As shown in FIGS. 2 and 3, the upper end flange 32 of the sleeve 28 confronts the lower load-bearing surface 26 of the head flange 24. The inner wall 36 of the sleeve 28 and the shank 18 have mutually engageable shoulders 38, 40 which permit free rotational movement of the bolts 12 within the sleeve 28 while limiting relative axial movement in such manner that the sleeve 28 is axially captive on the shank 18.

The fastener assembly 10 further includes a resilient grommet 42 having an annular solid body 44 disposed about the sleeve 28 with an upper load-bearing surface 46 and a lower load-bearing shoulder 48 from which a radially reduced cylindrical collar portion 50 extends. A rigid metallic flat washer 52 is disposed on the upper surface 46 between the flange 24 of the head 14 and the body 44 of the grommet 42. The flat washer 52 confronts the load-bearing surface 26 of the flange 24 radially outwardly of the upper end flange 32 of the sleeve 28. The grommet 42 is fabricated from a suitable elastomer, such as rubber, thermoplastic elastomers, or the like. The grommet 42 is sized to fit tightly about the sleeve 28 and is captured axially on the sleeve 28 by the end flanges 32, 34.

The fastener assembly 10 also includes an integrated cup washer 54 that is disposed about and captured axially on the grommet 42 The cup washer 54 includes a generally flat, annular base portion 56 having an upper surface 58 engaging the lower shoulder 48 of the grommet 42, and a lower load-bearing surface 60. The base 56 extends beneath the body 44 of the grommet 42 and is formed with a central aperture 62 through which the shank 18, sleeve 28 and collar 50 of the grommet 42 extend, with the collar 50 serving to isolate the bolt 12 and sleeve 28 from metal-to-metal contact with the cup washer 54.

The cup washer 54 includes a generally cylindrical side wall 64 formed integrally with the base 56 and extending upwardly therefrom in encircling relationship about the grommet 42. The side wall 64 and base 56 define a cup-shaped well or socket 66 in which the grommet 42 is housed and contained both axially and radially. An annular space 68 is provided between the inner wall of the washer 54 and the outer surface of the grommet 42 to accommodate controlled compression and deformation of the grommet 44 when installed, as illustrated by a comparison of FIGS. 2 and 3.

The cup washer 54 further includes a grommet retaining portion in a preferred form of radial tabs or ears 70 formed integrally with the side wall 64 and projecting radially inwardly therefrom from an upper edge 71 thereof in overlying, confronting relation to an annular retaining shoulder 72 of the grommet 42 extending radially beyond the flange 24 of the head 14. The retaining ears 70 are spaced radially outwardly of the flange 24 so as not to make contact with or interfere with the axial movement of the bolt 12 and to retain an isolated relationship between the bolt 12 and cup washer 54 by the intervening grommet 42. The interaction between the retaining ears 70 and shoulder 72 of the grommet 42 restrain the cup washer 54 axially on the grommet 42 in one direction, and the interaction between the base 56 and the lower shoulder 48 of the grommet 42 restrain the cup washer 54 on the grommet 42 in the opposite axial direction, thereby capturing the cup washer 54 on the grommet 42.

As shown best in FIG. 1, there are preferably a plurality of such retaining ears 70 provided at circumferentially spaced intervals about the upper edge 71 of the side wall 64, with four such ears 70 being illustrated in the present embodiment. The cup washer 54 may be fabricated from a suitable metal, such as steel, in which case the retaining ears 70 may be formed as integral extensions of the side wall 64 bent inwardly following the extension of the grommet 42 into the socket 66 so as to overlie the retaining shoulder 72 of the grommet 42 as illustrated, thereby integrating the cup washer 54 with the remaining components of the fastener assembly 10. The cup washer 54 may also be fabricated of rigid polymeric materials of suitable strength and heat resistance, in which case the ears 70 may be thermally deformed such as by heat staking into the overlying capturing relation with the grommet 42.

The present fastener assembly 10 is particularly useful in applications where there would otherwise be insufficient support for the grommet, such as the arrangement shown in FIG. 3. Shown is an upper component 74 secured via the fastener assembly 10 to a lower component 76. The upper and lower components 74, 76 may comprise, for example, a valve or rocker arm cover or oil pan of an internal combustion engine and an associated cylinder head or block, respectively. In the present illustration, the upper component 74 lacks the traditional grommet well that normally would receive and support the grommet of a multi-part vibration isolating fastener. As such, there would be insufficient support for the grommet 42 but for provision of the cup washer 54 of the present invention.

As illustrated in FIG. 3, the free end 20 of the bolt 12 may be extended through an oversized opening 78 in the valve cover 74 and received in a threaded bore 80 of the cylinder head 76. Upon tightening the bolt 12, the lower surface 60 of the cup washer 54 confronts an upper surface 82 of the valve cover 74, and further tightening of the bolt 12 compresses the body 44 of the grommet 42 between the base 56 of the cup washer 54 and the flange 24 of the bolt head 14, causing the grommet 42 to deform within the socket 56 and bulge radially outwardly, bringing the retaining shoulder 72 into confronting, sealed engagement with the inner surface of the side wall 64, forming a fluid-tight circumferential seal between the grommet 42 and the wall 64 of the cup washer 54. The shoulder 72 prevents fluid and debris from entering cavity 68. The radial clearance between the ears 70 and flange 24 of the bolt 12 enable the flange 24 to move axially past the ears 70 during tightening. The lower end flange 34 of the sleeve 28 bears against an upper surface 84 of the cylinder head 76, to limit the extent to which the shank 18 can be threaded into the bore 80 of the head 76, and thereby limiting the axial travel and thus the clamping pressure applied between the valve cover 74 and head 76 so as not to over compress the isolator 42 and sealing gasket 86 disposed therebetween.

It will be appreciated from FIG. 3 that the grommet 42 isolates the upper component 74 from vibrations of the lower component 76 and vice versa. Vibrations from the cylinder head 76, for example, that transmit to the bolt 12 and sleeve 28 are isolated by the grommet 42 from being transmitted to the integrated cup washer 54 and valve cover 74, since the grommet 42 is interposed therebetween and acts to dampen and absorb unwanted vibrations preventing them from being transmitted to the cup washer 54 and valve cover 74.

It will be appreciated that significant advantages are gained by capturing the cup washer 54 axially on the grommet 42. The multiple parts of the fastener assembly 10, including the cup washer 54, are integrated in a pre-assembled state as a single, ready to use unit.

Obviously, many modifications and variations of the present invention are possible in light of the above teachings. It is, therefore, to be understood that within the scope of the appended claims, the invention may be practiced otherwise than as specifically described. the invention is defined by the claims.

What is claimed is:

1. A multi-part vibration isolating fastener assembly comprising:
   a fastener having a head and a threaded shank extending axially from said head;
   an elongate sleeve disposed about said shank;
   a resilient grommet disposed about and captured on said sleeve; and
   an integrated rigid cup washer disposed about and captured on said grommet and isolated from direct contact with said bolt and said sleeve by said grommet.

2. The assembly of claim 1 wherein said grommet includes a lower shoulder and said cup washer includes a base underlying said lower shoulder of said grommet.

3. The assembly of claim 2 wherein said cup washer includes a side wall extending from said base in surrounding relation to said grommet.

4. The assembly of claim 3 wherein said grommet includes an upper shoulder and said cup washer includes a retaining portion extending from said side wall radially inwardly in overlying relation to said upper shoulder of said grommet, said base and said retaining portion operative to captivate said cup washer axially on said grommet.

5. The assembly of claim 3 wherein said grommet includes a body having an upper annular shoulder portion extending from said body toward said side wall of said cup washer, said grommet being resiliently compressible between said fastener and said cup washer in the axial direction of said fastener and radially expandable in response thereto bringing said upper shoulder into sealing engagement with said side wall of said cup washer.

6. The assembly of claim 1 wherein said cup washer is fabricated of metal.

7. The assembly of claim 1 wherein said cup washer is fabricated of a rigid polymer material.

8. The assembly of claim 1 wherein said cup washer includes a base portion extending beneath a lower shoulder of said grommet and including an aperture through which a collar portion of said grommet and said threaded shank extend.

9. The assembly of claim 8 wherein said cup washer includes a generally cylindrical side wall projecting from said base and surrounding said grommet and defining a cup-shaped socket for supporting and containing deformation of said grommet.

10. A multi-part vibration isolating fastener assembly comprising:

a bolt having a head and threaded shank extending axially from said head;

a sleeve disposed about said shank and having radially outwardly extending flanges formed at opposite ends of said sleeve;

a resilient grommet disposed about said sleeve having an upper shoulder and a lower shoulder and captured axially on said sleeve by said end flanges; and a rigid cup washer disposed about said grommet having a base underlying said lower shoulder of said grommet, an aperture through which said shank of said bolt and a collar of said grommet extend, an upstanding side wall extending from said base in surrounding relation to said grommet defining a cup-shaped socket for said grommet, and an upper retaining portion of said cup washer extending radially inwardly from said side wall in overlying relation to said upper shoulder of said grommet.

* * * * *